United States Patent [19]

Garratt et al.

[11] 3,847,769

[45] Nov. 12, 1974

[54] PROCESS FOR CURING HYDANTOIN-CONTAINING POLYACRYLATES WITH IONISING RADIATION

[75] Inventors: Peter Garth Garratt, Wallisellen; Juergen Habermeier, Pfeffingen; Daniel Porret, Binningen; Ernst Leumann; Paul Zuppinger, both of Arlesheim, all of Switzerland

[73] Assignee: Ciba-Geigy AG, Basel, Switzerland

[22] Filed: Jan. 13, 1972

[21] Appl. No.: 217,669

[30] Foreign Application Priority Data
July 9, 1971   Switzerland...................... 10123/71

[52] U.S. Cl....... 204/159.22, 117/93.31, 117/132 R, 117/132 BE, 117/138.8 R, 204/159.15, 204/159.16, 260/2 EP, 260/41 B, 260/78.4 EP, 260/86.1 E, 260/86.1 N, 260/89.5, 260/836, 260/837 R

[51] Int. Cl............................ C08d 1/00, C08f 1/16

[58] Field of Search.......... 260/835, 836, 837, 2 EP; 204/159.22, 159.14, 159.15

[56] References Cited
UNITED STATES PATENTS

| | | | |
|---|---|---|---|
| 3,256,226 | 6/1966 | Fekete et al. | 260/836 |
| 3,641,064 | 2/1972 | Heer et al. | 260/2 EP |
| 3,640,910 | 2/1972 | Parret et al. | 260/2 EP |
| 3,586,529 | 8/1969 | Aronoff et al. | 260/835 |
| 3,432,478 | 3/1969 | May | 260/837 |
| 3,408,422 | 10/1968 | May | 260/837 |
| 3,377,406 | 4/1968 | Newey et al. | 260/837 |

*Primary Examiner*—Paul Lieberman
*Assistant Examiner*—Richard B. Turer
*Attorney, Agent, or Firm*—Karl F. Jorda

[57] ABSTRACT

Process for curing polyacrylates, especially in the form of thin layers or coatings, of the formula

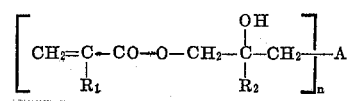

wherein $R_1$ and $R_2$ denote a hydrogen atom or the methyl group and $n$ denotes the number 2 or 3 and A denotes an organic radical which contains at least one grouping

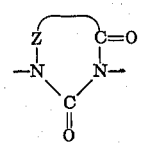

wherein Z represents a divalent radical required to complete a five-membered or six-membered ring, by means of ionising rays, for example electron beams, X-rays or gamma-rays.

The resulting coatings show improved weathering resistance, extensibility and gloss retention.

14 Claims, No Drawings

PROCESS FOR CURING HYDANTOIN-CONTAINING POLYACRYLATES WITH IONISING RADIATION

It is known to bring about the crosslinking of synthetic resin polymers by the action of ionising rays, for example X-rays, gamma-rays, beta-particles or beams of greatly accelerated electrons. In most industrial applications of these methods of irradiation, electrons having an energy of between 50 and 4,000 KeV have been used.

It is furthermore known to utilise ionising rays for curing synthetic resin coatings consisting of mixtures of unsaturated polyesters and reactive olefinically unsaturated monomers. These known coatings obtained by radiation curing, whilst generally showing good mechanical properties, also possess some disadvantages for many technical applications, such as, for example, inadequate weathering resistance, inadequate extensibility and impact strength, and low gloss retention.

It has now been found, surprisingly, that coatings with improved weathering resistance, extensibility and gloss retention are obtained if instead of the known synthetic resin coatings of unsaturated polyester resins and reactive monomers coatings of polyacrylates which contain at least one grouping

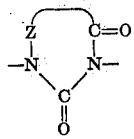

wherein Z denotes a divalent radical required to complete a five-membered or six-membered, unsubstituted or substituted heterocyclic ring, in the molecule, are irradiated in solution or, if appropriate, as a mixture with reactive monomers.

The subject of the present invention is hence a process for curing polyacrylates, especially in the form of thin layers or coatings, by means of ionising rays, characterised in that polyacrylates of the general formula

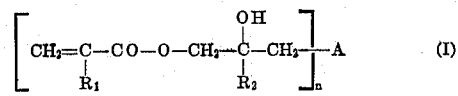

wherein $R_1$ and $R_2$ independently of one another each represent a hydrogen atom or the methyl group, $n$ denotes the number 2 or 3 and A denotes an organic radical which contains at least one grouping

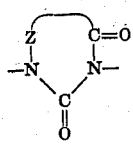

in which Z denotes a divalent radical which is required to complete a five-membered or six-membered, unsubstituted or substituted, heterocyclic ring, are used by themselves or, if appropriate, as a mixture with other reactive monomers.

The radical Z in the N-heterocyclic grouping of the formula I preferably only contains carbon and hydrogen atoms or carbon, hydrogen and oxygen atoms. It can, for example, be a radical of the formulae

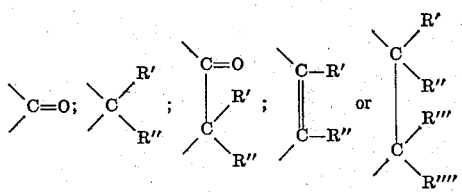

wherein R', R'', R''' and R'''' independently of one another can each denote a hydrogen atom or, for example, an alkyl radical, preferably a lower alkyl radical with 1 – 4 C atoms, an alkenyl radical, preferably a lower alkenyl radical with 1 – 4 C atoms, a cycloalkyl radical or an optionally substituted phenyl radical.

The radical Z can, however, also consist of a nitrogen-containing radical of the formula

wherein X represents the acryloxy- or methylacryloxy-2-hydroxypropyl or -2-hydroxy-2-methylpropyl radical according to the formula I.

The polyacrylates of the formula I can be manufactured if $n$ mols of acrylic acid and/or methacrylic acid are added, in a manner which is in itself known, to 1 mol of a polyglycidyl compound of the general formula

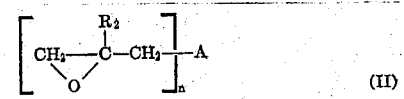

wherein $R_2$, $n$ and A have the same meaning as in the formula I above.

The addition reaction is preferably carried out in the melt; however, it can also be carried out in solution. The addition of the acrylic acid or methacrylic acid is effected at 20°–180°C, preferably at 60°–140°C, without catalysts or in the presence of basic catalysts. The course of the addition reaction can easily be followed by continuously examining the epoxide content of the reaction mixture or by titration of the unreacted acrylic acid.

Suitable basic catalysts for the addition of acrylic acid or methacrylic acid to the polyglycidyl compound of the formula II are above all tertiary amines, such as triethylamine, tri-n-proplyamine, benzyldimethylamine, N,N'-dimethylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; further, ion exchange resins possessing tertiary or quaternary amino groups; further, trialkylhydrazonium salts, such as trimethylhydrazonium iodide.

Further suitable catalysts are also low molecular thioethers and sulphonium salts.

As such thioethers or sulphonium salts there may be mentioned: diethyl-sulphide, β-hydroxyethyl-ethyl-sulphide, β-hydroxypropyl-ethyl-sulphide, ω-hydroxy-tetramethylene-ethyl-sulphide, thiodiglycol, mono-β-cyanoethylthioglycol-ether, dibenzyl-sulphide, benzyl-ethyl-sulphide, benzyl-butyl-sulphide, trimethylsulphonium iodide, tris(β-hydroxy-ethyl)sulphonium chloride, dibenzylmethylsulphonium bromide, 2,3-epoxypropylmethylethylsulphonium iodide, dodecyl-methyl-sulphide and dithiane.

The reaction can, however, also be accelerated by adding other suitable alkaline reagents, such as sodium hydroxide, potassium hydroxide, barium hydroxide, calcium hydroxide, sodium carbonate, potassium carbonate and sodium acetate.

The polyglycidyl compounds of the formula II are known compounds and can be manufactured if N-heterocyclic compounds which contain at least one grouping

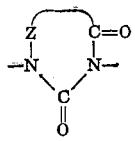

in which Z denotes a divalent radical which is necessary to complete a five-membered or six-membered, unsubstituted or substituted, heterocyclic ring, are reacted in one step or several steps with an epihalogenohydrin or β-methylepihalogenohydrin, such as, for example, epichlorohydrin, β-methylepichlorohydrin or epibromohydrin, with elimination of hydrogen halide, in a manner which is in itself known.

The polyglycidyl compounds of the formula II used for the manufacture of the polyacrylates of the formula I are above all mononuclear and binuclear N-heterocyclic polyglycidyl compounds. It is, however, also possible to use polyglycidyl compounds wherein the N-heterocyclic ring occurs more than twice in the molecule.

The mononuclear polyglycidyl compounds of the formula II correspond to the general formula

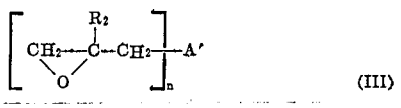

wherein $R_2$ represents a hydrogen atom or the methyl group, $n$ denotes the number 2 or 3 and $A'$ denotes an organic radical which contains one grouping

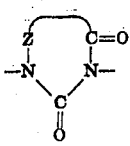

in which Z denotes a divalent radical which is necessary to complete a five-membered or six-membered, unsubstituted or substituted, heterocyclic ring.

A preferred sub-category of mononuclear N-heterocyclic polyglycidyl compounds of the formula III corresponds to the formula

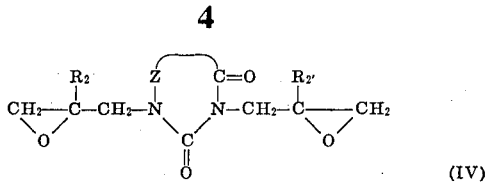

wherein $R_2$ and $R_2'$ independently of one another represent a hydrogen atom or the methyl group and Z has the same meaning as in the formula III. There may be mentioned the N,N'-diglycidyl compound of the formula

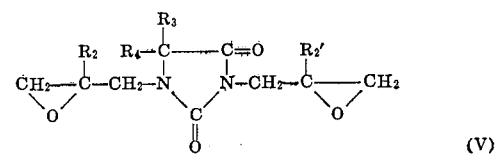

wherein $R_2$ and $R_2'$ have the same meaning as in the formula IV and wherein $R_3$ and $R_4$ each denote a hydrogen atom or a lower alkyl radical with 1 to 4 carbon atoms, or wherein $R_3$ and $R_4$ together form a tetramethylene or pentamethylene radical; examples of this category of compounds are, for example: 1,3-diglycidylhydantoin, 1,3-diglycidyl-5-methylhydantoin, 1,3-diglycidyl-5-n-propylhydantoin, 1,3-diglycidyl-5-methyl-5-ethylhydantoin, 1,3-diglycidyl-1,3-diazaspiro(4.5)-decane-2,4-dione, 1,3-diglycidyl-1,3-diazaspiro(4.4)-nonane-2,4-dione and especially 1,3-diglycidyl-5,5-dimethylhydantoin, 1,3-diglycidyl-5-isopropylhydantoin, and also 1,3-di-(β-methylglycidyl)-5,5-dimethylhydantoin.

Further, there may be mentioned N,N'-diglycidyl compounds of the formula

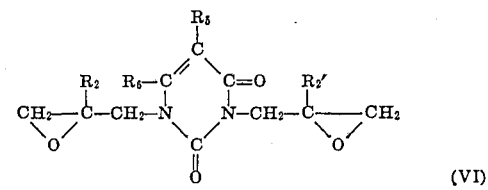

wherein $R_2$ and $R_2'$ have the same meaning as in the formula IV and wherein $R_5$ and $R_6$ independently of one another each denote a hydrogen atom or a lower alkyl radical with 1 to 4 carbon atoms; examples of this category of compounds are, for example, 1,3-diglycidyluracil, 1,3-diglycidyl-6-methyluracil, 1,3-diglycidyl-5-methyluracil and 1,3-di-(β-methylglycidyl)-uracil.

Further, there should be mentioned N,N'-diglycidyl compounds of the formula

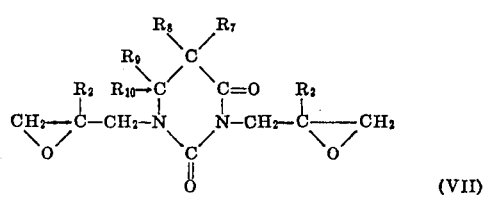

wherein $R_2$ and $R_2'$ have the same meaning as in the formula IV and wherein $R_7$ and $R_8$ both denote hydrogen atoms or identical or different alkyl radicals, preferably alkyl radicals with 1 to 4 carbon atoms, and $R_9$ and $R_{10}$ independently of one another each denote a hydrogen atom or a, preferably lower, alkyl radical with 1–4 C atoms.

Examples of this category of compounds are, for example, 1,3-diglycidyl-5,5-dimethyl-5,6-dihydrouracil, 1,3-diglycidyl-5,5-dimethyl-6-isopropyl-5,6-dihydrouracil and 1,3-di-($\beta$-methylglycidyl)-5,5-dimethyl-5,6-dihydrouracil. Additionally, attention should be drawn to the N,N'-diglycidyl compounds of barbituric acid and of parabanic acid.

A further preferred sub-category of mononuclear N-heterocyclic polyglycidyl compounds of the formula III corresponds to the general formula

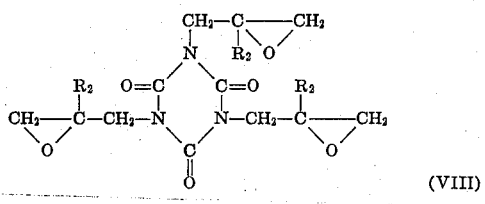

(VIII)

wherein $R_2$ has the same meaning as in the formula III. Examples of these categories of compounds are triglycidylisocyanurate and tri-($\beta$-methylglycidyl)isocyanurate.

A further preferred sub-category of mononuclear N-heterocyclic polyglycidyl compounds of the formula III corresponds to the general formula

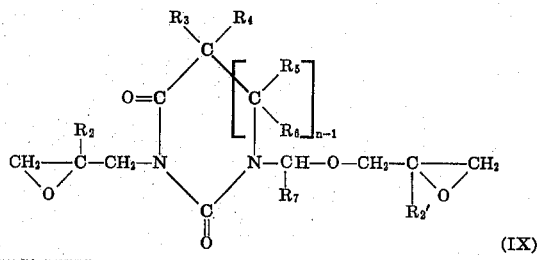

(IX)

wherein $R_2$ and $R_2'$ independently of one another represent a hydrogen atom or the methyl group and wherein $R_3$ and $R_5$ independently of one another each denote a hydrogen atom or an aliphatic, cycloaliphatic, araliphatic or aromatic hydrocarbon radical, such as, in particular, a lower alkyl radical with 1 to 4 carbon atoms, $R_4$, $R_6$ and $R_7$ each represent an alkyl radical, especially a lower alkyl radical with 1 to 4 carbon atoms, or a hydrogen atom, or $R_3$ and $R_4$ together form a divalent aliphatic or cycloaliphatic hydrocarbon radical, preferably a tetramethylene or pentamethylene radical, and $n$ denotes an integer having a value of 1 or 2.

As examples of this category of compounds there may be mentioned: 1-glycidyloxymethyl-3-glycidyl-5,5-dimethylhydantoin, 1-(1'-glycidyloxyethyl)-3-glycidyl-5,5-dimethylhydantoin, 1-glycidyloxymethyl-3-glycidyl-5-isopropylhydantoin, 1-glycidyloxymethyl-3-glycidyl-5,5-tetramethylenehydantoin, 1-glycidyloxymethyl-3-glycidyl-5-ethyl-5-methylhydantoin and 1-glycidyloxymethyl-3-glycidyl-5,5-dimethyl-5,6-dihydrouracil.

A further preferred sub-category of mononuclear N-heterocyclic polyglycidyl compounds of the formula III corresponds to the general formula

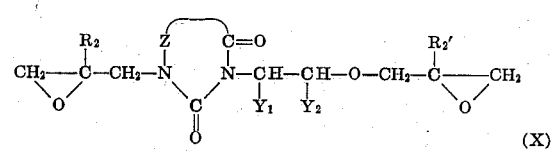

(X)

wherein $R_2$ and $R_2'$ independently of one another each denote a hydrogen atom or the methyl group, Z denotes a nitrogen-free divalent radical which is required to complete a five-membered or six-membered, unsubstituted or substituted heterocyclic ring, and wherein $Y_1$ represents a hydrogen atom or the methyl group and $Y_2$ represents a hydrogen atom or the methyl, ethyl or phenyl group, or wherein $Y_1$ and $Y_2$ together denote the trimethylene or tetramethylene radical.

As examples of this category of compounds there may be mentioned: 1-glycidyl-3-($\beta$-glycidyloxyethyl)-6-methyluracil, 1-glycidyl-3-($\beta$-glycidyloxyethyl)-5,5-dimethylhydantoin, 1-glycidyl-3-($\beta$-glycidyloxy-n-propyl)-5,5-dimethyl-6-isopropyl-5,6-dihydrouracil, 1-$\beta$-methylglycidyl-3-[$\beta$-($\beta'$-methylglycidyloxy)-ethyl]-5,5-dimethylhydantoin, 1-glycidyl-3($\beta$-glycidyloxy-$\beta$-phenylethyl)-5,5-dimethylhydantoin, 1-glycidyl-3($\beta$-glycidyloxy-$\beta$-phenylethyl)-5-ethyl-5-phenylbarbituric acid, 1-glycidyl-3-($\beta$-glycidyloxy-n-butyl)-5,5-dimethylhydantoin and 1-glicidyl-3-($\beta$-glycidyloxycyclohexyl)-5,5-dimethylhydantoin.

The binuclear polyglycidyl compounds according to the formula II used for the manufacture of the polyacrylates of the formula I correspond to the general formula

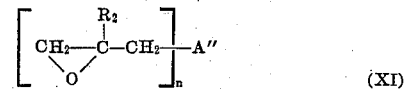

(XI)

wherein $R_2$ represents a hydrogen atom or the methyl group and $A''$ denotes an organic radical of the formula

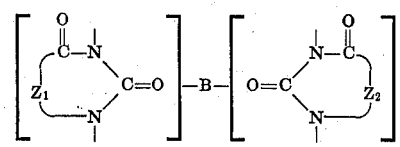

in which $Z_1$ and $Z_2$ independently of one another each denote a divalent radical which is necessary to complete a five-membered or six-membered, unsubstituted or substituted heterocyclic ring, and B represents a divalent aliphatic, cycloaliphatic or araliphatic radical, and in particular preferably an alkylene radical, or an alkylene radical which is interrupted by oxygen atoms or ester groups.

A preferred sub-category of binuclear N,N'-diglycidyl compounds of the formula XI corresponds to the general formula

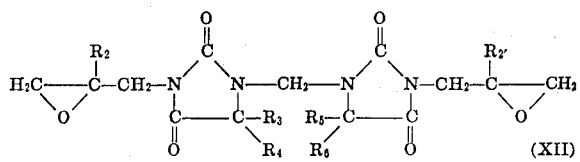

wherein $R_2$ and $R_2'$ independently of one another represent a hydrogen atom or the methyl group and $R_3$, $R_4$, $R_5$ and $R_6$ each denote a hydrogen atom or a lower alkyl radical with 1 to 4 carbon atoms, or wherein $R_3$ and $R_4$ or $R_5$ and $R_6$ together form a tetramethylene or pentamethylene radical; examples of this category of compounds are, for example, bis-(3-glycidyl-5,5-dimethylhydantoinyl-1)-methane, bis-(3-glycidyl-5-methyl-5-ethylhydantoinyl-1)-methane and bis-(3-glycidyl-5-propylhydantoinyl-1)-methane.

A further preferred sub-category of binuclear N,N'-diglycidyl compounds of the formula XI corresponds to the general formula

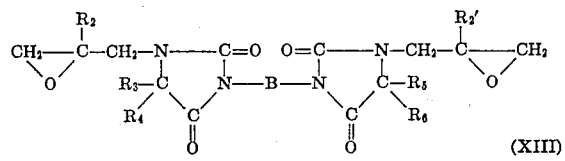

wherein $R_2$ and $R_2'$ have the same meaning as in the formula XII, B represents an aliphatic, cycloaliphatic or araliphatic radical and $R_3$, $R_4$, $R_5$ and $R_6$ each denote a hydrogen atom or a lower alkyl radical with 1 to 4 carbon atoms, or wherein $R_1$ and $R_2$ and/or $R_3$ and $R_4$ together form a tetramethylene or pentamethylene radical; examples of this category of compounds are, for example, bis-(1-glycidyl-5,5-dimethylhydantoinyl-3)-methane, 1,2-bis-(1'-glycidyl-5',5'-dimethylhydantoinyl-3')-ethane, 1,4-bis-(1'-glycidyl-5',5'-dimethylhydantoinyl-3')-butane, 1,6-bis-(1'-glycidyl-5',5'-dimethylhydantoinyl-3')-hexane, 1,12-bis-(1'-glycidyl-5',5'-dimethylhydantoinyl-3')-dodecane, $\beta,\beta'$-bis-(1'-glycidyl-5',5'-dimethyhydantoinyl-3')-diethyl-ether and 1,4-bis-(1'-$\beta$-methylglycidyl-5',5'-dimethylhydantoinyl-3')-butane.

A further preferred sub-category are binuclear N,N'-diglycidyl compounds of the following formula

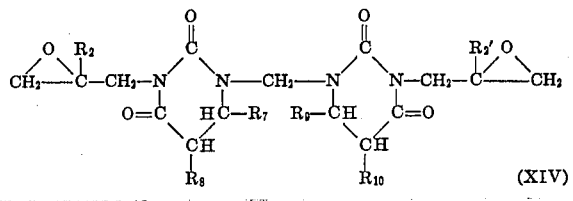

wherein $R_2$ and $R_2'$ have the same meaning as in the formula XII and $R_7$, $R_8$, $R_9$ and $R_{10}$ independently of one another each denote a hydrogen atom or a lower alkyl radical with 1 to 4 carbon atoms; examples of this category of compounds are, for example 3,3'-diglycidyl-1,1'-methylene-bis-(5,6-dihydrouracil), 3,3'-diglycidyl-1,1'-methylene-bis-(6-methyl-5,6-dihydrouracil), 3,3'-diglycidyl-1,1'-methylene-bis-(5,5-dimethyl-5,6-dihydrouracil) and 3,3'-di-($\beta$-methylglycidyl)-1,1'-methylene-bis-(5,6-dihydrouracil).

A further preferred sub-category of binuclear N,N'-diglycidyl compounds of the formula XI corresponds to the general formula

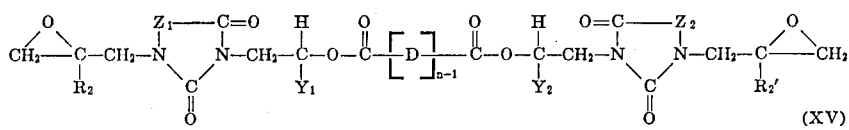

wherein $R_2$ and $R_2'$ have the same meaning as in the formula XII, $Y_1$ and $Y_2$ each represent a hydrogen atom, a methyl group, an ethyl group or a phenyl group, $Z_1$ and $Z_2$ independently of one another each denote a nitrogen-free, divalent radical which is necessary to complete a five-membered or six-membered, unsubstituted or substituted heterocyclic ring, D represents the hydrocarbon radical of a dicarboxylic acid obtained by removing the carboxyl groups and $n$ denotes the number 1 or 2.

Examples of this category of compounds are, for example, sebacic acid bis-(N-glycidyl-5,5-dimethylhydantoinyl-3-2'-hydroxy-n-propyl ester), sebacic acid bis-(N-glycidyl-5,5-dimethylhydantoinyl-3-2'-hydroxy-n-butyl ester), glutaric acid bis-(N-glycidyl-5,5-dimethylhydantoinyl-3-2'-hydroxy-n-propyl ester) and succinic acid bis-(N-glycidyl-5,5-dimethylhydantoinyl-3-2'-hydroxyethyl ester).

A further possible category of suitable polyglycidyl compounds are those which contain more than two of the N-heterocyclic rings in the molecule. These compounds can be manufactured if dicarboxylic acids are reacted with diglycidyl compounds in the appropriate molar ratio.

Possible monomers which can be added to the polyacrylates of the formula (I) are above all compounds of the acrylic acid series, such as esters of acrylic acid or methacrylic acid and alcohols or phenols, for example methyl acrylate, ethyl acrylate, butyl acrylate, dodecyl acrylate and methyl methacrylate; acrylonitrile, methacylonitrile and ethylene glycol dimethacrylate. Furthermore, it is also possible to use other reactive olefinically unsaturated monomers, such as, for example, styrene, divinylbenzene, vinyl esters, such as vinyl acetate, allyl compounds, such as diallyl phthalate and others.

The polyacrylates which are particularly suitable for the manufacture of coatings can additionally contain plasticisers, fillers and, preferably, pigments, for example titanium dioxide. 5,5-dimethylhydantoin and 1-glicidyl- The polyacrylate mixtures show good adhesion to the surface of the base material so that coatings on metals, wood, plastics, glass, paper, leather and the like can be produced without difficulties.

The curing of the polyacrylates can be effected with any ionising radiation, preferably with a high energy electromagnetic radiation, such as, for example X-rays or gamma-radiation, and with accelerated electrons. In the latter case, an average electron energy of 50 keV to 4,000 keV is used. If the curing of thin layers, such as, for example coatings, is involved, an average electron energy of 50 to 600 keV and a curing dose of 0.5 to 5.0 Megarad, preferably of 1.0 to 3.0 Megarad is used.

The polyacrylates can advantageously be additionally subjected to a heat treatment before, during or after curing, which in some cases facilitates the crosslinking.

The curing is appropriately carried out in the absence of oxygen. To achieve this, a protective gas atmosphere, for example nitrogen, is used.

In some cases it is advantageous to add small amounts of a polymerisation catalyst which forms free radicals, such as, for example, peroxides, azo compounds and persulphates, to the polyacrylates.

In the examples which follow, unless otherwise stated, parts denote parts by weight and percentages denote percentages by weight.

Manufacture of the polyacrylates

Polyacrylate A 1,017 g (corresponding to 3 mols) of a technically manufactured 1-glycidyl-3-(β-glycidyloxy-n-propyl)-5,5-dimethylhydantoin (epoxide content: 5.9 equivalents/kg) are warmed to 110°C.

2.9 g of hydroquinone are added and the dropwise addition of 432.4 g of acrylic acid is started immediately. After 10 minutes, one-third of the acrylic acid has been added and the reaction becomes so exothermic that after removal of the heating bath the temperature rises to 125°C.

After 20 minutes, a further 2.9 g of hydroquinone are added. After a total of 35 minutes the entire amount of acrylic acid has been added and after the exothermic effect has subsided the reaction mixture is stirred at 120°-130°C. 20 minutes after completion of the dropwise addition the epoxide content of the reaction mixture is 1.36 equivalents/kg. 120 minutes later, the content of epoxide groups has dropped to 0.3 equivalent/kg. The clear liquid is introduced into a dark bottle. After cooling, the adduct, which is produced quantitatively, is a viscous liquid; the epoxide content is 0.23 equivalent/kg, corresponding to approx. 95% addition. The content of polymerisable double bonds in the product is 4.2 equivalents/kg and the product principally corresponds to the following structure:

Polyacrylate B 206 g of technically manufactured 1-glycidyl-3-(β-glycidyloxy-n-propyl)-5,5-dimethylhydantoin (0.591 mol) are stirred at 100°C. 0.3 g of anhydrous sodium acetate and 0.1773 g of hydroquinone are added and 102.2 g of distilled methacrylic acid (1.182 mols) are added dropwise thereto over the course of 30 minutes. When half the amount of acid has been added dropwise, 0.0591 g of hydroquinone are added. After the dropwise addition, a last hydroquinone addition of 0.0591 g is stirred into the reaction mixture and the temperature is raised to 125°C.

75 minutes after completion of the addition of the methacrylic acid, the epoxide content has dropped to 0.768 equivalents/kg. 5 hours after the dropwise addition it has dropped to 0.147 equivalent/kg.

A comparison experiment without the addition of sodium acetate shows an epoxide content of 1.43 equivalents/kg (as compared to 0.768) 75 minutes after completion of the dropwise addition of the methacrylic acid to the reaction mixture; 5 hours after the dropwise addition, 0.39 epoxide equivalent/kg are still present (as compared to 0.147). The content of polymerisable double bonds is 4.05 equivalents/kg.

Both products essentially correspond to the following structure:

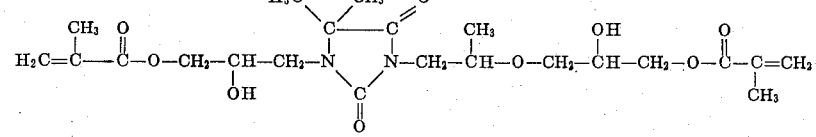

Polyacrylate C 3,964 g of sebacic acid bis-(N-glycidyl-5,5-dimethylhydantoinyl-3-(2'-hydroxy-n-propyl) ester) having an epoxide content of 3.045 equivalents/kg (≈ 6.035 mols) are heated to 100 2 C in a dry glass apparatus of 6 litres' capacity, equipped with a stirrer, thermometer, reflux condenser and dropping funnel. 9.6 g of hydroquinone are added whilst stirring and the dropwise addition of 869.8 g of freshly distilled acrylic acid is started immediately. The time for the dropwise addition is 60 minutes. The reaction becomes exothermic. After removal of the heating bath, the reaction mixture reaches a temperature of 125°C. The mixture is stirred for a further 8 hours at 125°C and the clear, pale yellowish liquid is poured into a dark glass bottle.

An adduct wherein the residual epoxide content is only about 0.09 equivalent/kg is obtained in quantitative yield. The average molecular weight determined by vapour pressure osmometry is 697 (theory = 698.9). The content of polymerisable double bonds is 2.5 equivalents/kg. Accordingly, the adduct essentially corresponds to the structure:

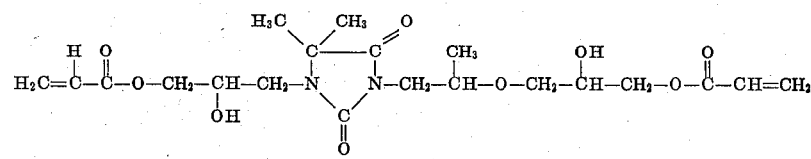

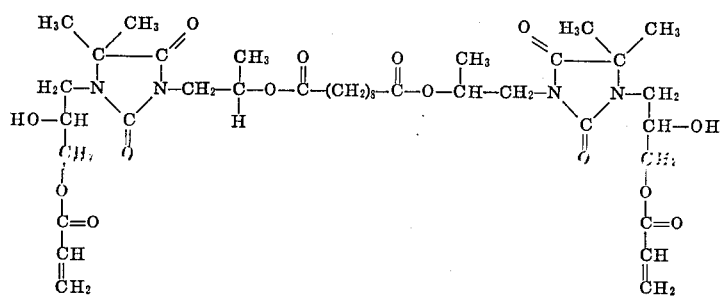

Polyacrylate D a. Analogously to the preceding examples, 161 g (0.9 equivalent) of a technical 1-glycidyl-3-(2'-glycidyloxy-n-propyl)-5,5-dimethylhydantoin (epoxide content 5.58 equivalents/kg) are reacted with 60.6 g (0.6 equivalent of sebacic acid with the addition of 0.8 g of triphenylphosphine, at 110°–125° internal temperature, until an acid number of 0–5 is reached; this is the case after approx. 1 hour. The exothermic reaction which occurs in the interim is kept at the indicated temperature by occasional cooling. As a result of the differing reactivity of the two esterifiable epoxide groups, an intermediate product of principally the following structure:

and having an epoxide content of 1.28 equivalents/kg (calculated: 1.35) is obtained.

b. This intermediate product is now stabilised with 0.8 g of hydroquinone and 21.6 g of acrylic acid (0.3 equivalent) are added dropwise over the course of 1 hour, at 110°–120°C. Thereafter the temperature is raised to 130°–140°C and the mixture is left to react until practically all the epoxide groups have been esterified, which is the case after 4–5 hours. A yellow resin which is highly viscous in the cold is obtained in quantitative yield; it has an epoxide content of 0.06 equivalent/kg and a content of polymerisable double bonds of 1.2 equivalents/kg, and is principally to be ascribed the following structure:

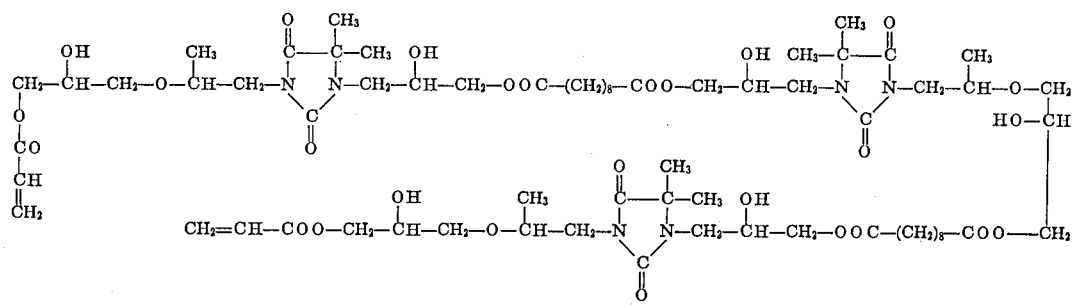

Polyacrylate E

If instead of the ratio of 0.9 equivalent of the epoxide compound used for the manufacture of polyacrylate D, 0.6 equivalent of sebacic acid and 0.3 equivalent of acrylic acid, a ratio of 0.8 equivalent of the same epoxide compound, 0.4 equivalent of sebacic acid and 0.4 equivalent of acrylic acid is employed and in other respects the reaction is carried out in the same manner as described for the manufacture of polyacrylate C, a yellow resin which is highly viscous when cold is obtained in quantitative yield; it has a content of polymerisable double bonds of 1.9 equivalents/kg and is to be ascribed principally the following structure:

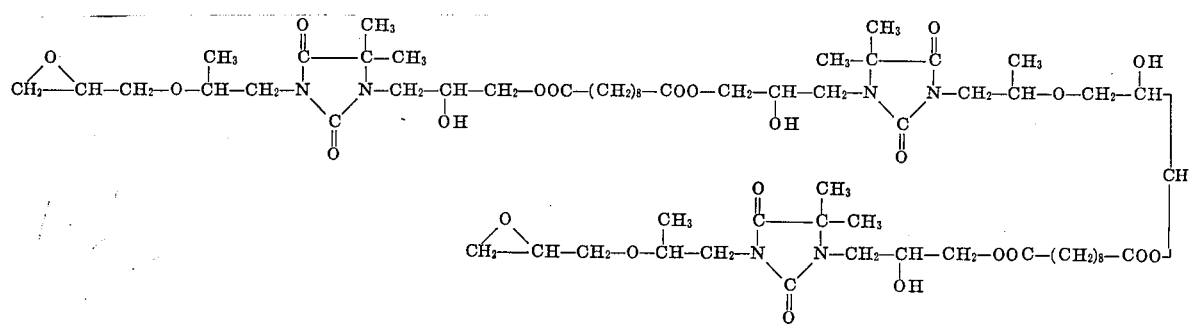

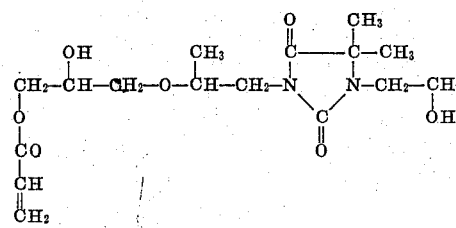 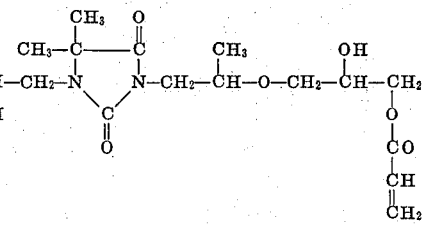

Example 1

90 mμ thick films of polyacrylates A to E and mixtures of these polyacrylates and polymerisable monomers according to Table 1 and Table 2 were applied to electrolytically pretreated iron sheet (sheet thickness 0.3 mm). After about 1 minute, these films were exposed to accelerated electrons of average energy 400 keV by passing the sheets longitudinally through an electron beam (radiation intensity 4 Megarad/second). The irradiations were carried out in a nitrogen atmosphere (maximum oxygen concentration 0.2%). Thereafter, the films were immediately examined for surface tackiness and their surface hardness was tested with a steel blade, using a simple test method. The resistance of the synthetic resin films to chemical solvents was tested by applying a drop of toluene (and acetone) and the proportion of insoluble matter was determined in a Soxhlet extraction apparatus by 24 hours' extraction with toluene. Tables 1 and 2 below show the results obtained. The curing dose is the minimum radiation dose which is required to produce a non-tacky film of good surface hardness.

It was found that at the indicated curing dose a high degree of crosslinking of the films is obtainable.

Example 2

60 mμ thick films of a solution manufactured from 70 parts of polyacrylate A and 30 parts of butyl acrylate were applied to steel sheets pretreated with zinc phosphate ("Granodine 6005," Sendzimir-galvanised steel, sheet thickness 0.75 mm). These steel sheets were irradiated as described in Example 1. Thereafter the films were immediately examined for their surface tackiness and their surface hardness according to the method described in Example 1. It was found that the films can be fully cured with a radiation dose of 2.0 Megarad.

After some days, the films were examined further. The dry layer thickness was determined according to VDI 2451 (non-destructive test). The film thickness was 35 mμ. The scratch hardness of the lacquer was determined with a hardness test rod (according to Erichsen; type 318). The films reached a value of 175 p (on the Erichsen scale). The adhesion was determined by the cross-cut method according to DIN 53,151 (with subsequent pulling-off with Tesafilm). A cross-cut of 0 was found. The behaviour of the lacquer on bending the material was tested by the mandrel bending test according to DIN 53,152. The coating was undamaged on bending around the 2 mm mandrel. The deformability of the coated material was determined by deep-drawing according to DIN 53,156. After a deepdraw of 8 mm the coating developed cracks. The pendulum hardness of the films was determined according to DIN 53,157 (Konig). The films attained a pendulum hardness of 140 seconds.

Example 3

Mixtures of 40 parts of polyacrylate C, 20 parts of butyl methacrylate and 30 parts of titanium dioxide (RCR-3) was applied to hardboard sheets obtainable under the registered trademark "Pavatex" from Papierfabrik Cham AG (film thickness 80 μ) and were irradiated in the same manner as described in Example 1.

Table 1

Curing dose and percentage of insoluble matter of cured polyacrylates of N-heterocyclic compounds

| Polyacrylate | C=C double bond content/kg | Curing dose (Megarad) | Insoluble matter in % |
|---|---|---|---|
| A | 4.2 | 0.75 | 100 |
| B | 4.05 | 1.5 | 100 |
| C | 2.5 | 2.0 | 100 |
| D | 1.2 | 2.5 | 95 |
| E | 1.9 | 4.0 | 82 |

Table 2

Curing dose and percentage of insoluble matter of cured mixtures of polyacrylates of N-heterocyclic compounds and polymerisation monomers

| Polyacrylate | Monomer | Weight ratio of polyacrylate:monomer | Curing dose (Megarad) | Insoluble matter in % |
|---|---|---|---|---|
| A | Butyl acrylate | 70 : 30 | 1.5 | 96 |
|   | Methyl methacrylate | 70 : 30 | 1.5 | 85 |
|   | Styrene | 70 : 30 | 7.0 | 100 |
| B | Butyl acrylate | 70 : 30 | 1.5 | 98 |
|   | Methyl methacrylate | 70 : 30 | 3.0 | 100 |
|   | Styrene | 70 : 30 | 5.0 | 85 |
| C | Butyl acrylate | 80 : 20 | 2.0 | 92 |
|   | Methyl methacrylate | 80 : 20 | 2.5 | 95 |
|   | Styrene | 80 : 20 | 4.0 | 99 |
| D | Butyl acrylate | 80 : 20 | 3.5 | 92 |
|   | Methyl methacrylate | 80 : 20 | 3.5 | 92 |
|   | Styrene | 80 : 20 | 6.0 | 90 |
| E | Butyl acrylate | 80 : 20 | 4.0 | 82 |
|   | Methyl methacrylate | 80 : 20 | 4.0 | 84 |
|   | Styrene | 80 : 20 | 4.0 | 74 |

The requisite curing dose was 4.5 Megarad (the dry layer thickness was approx. 55 μ).

The film properties were further examined after 24 hours. The surface hardness was determined according to SNV 37,113 (pencil hardness) and DIN 53,153 (Buchholz). The films attained a pencil hardness of 2–3 H and a Buchholz indentation resistance of 91°. The scratch hardness (according to Taber) was 400 g. A cross-cut of 1 (according to DIN 53,151, with subsequent pulling off with Tesafilm) was measured. The abrasion resistance was tested with a Taber test apparatus (clamping device, CS-17 grindstone, 2 × 500 g load). An abrasion of 15 mg/500 revolutions was found. The coatings have good resistance to chemicals; none of the customary household liquids — such as sodium carbonate solution or soap solution — leads to damage. Good resistance to keys was found.

Example 4

60 μ thick films of a mixture based on polyacrylate B in butyl acrylate (70 : 30) were applied to ABS (acrylo-nitrile-butadiene-styrene) plastic sheets and irradiated in the same manner as described in Example 1. The requisite curing dose was 2.5 Megarad.

The subsequent test shows that the films reached a pencil hardness of F-H (according to SNV 37,113) and a Buchholz indentation resistance (DIN 53,153) of 100°. The scratch hardness (according to Erichsen — hardness test rod type 318) was 175 p. A cross-cut of 0 (according to DIN 53,151, with subsequent pulling-off with Tesafilm) was measured. The films furthermore attained a pendulum hardness (according to DIN 53,157) of 150 seconds.

The lacquer coatings are distinguished by improved abrasion resistance and scratch resistance as compared to the untreated ABS plastic sheets. The untreated sheets have a scratch hardness of < 50 p (measured according to the Erichsen scale). The adhesion of the films was excellent.

Example 5

Polyacrylate C and mixtures of polyacrylate C and polymerisable monomers (according to Table 3) are introduced into tubes of 1.25 cm diameter up to a height of about 2.5 cm and exposed to the gamma radiation of a ⁶⁰Co source of rays. These experiments were carried out at approx 30°C and in the presence of oxygen. After the irradiation, the degree of crosslinking was determined by extraction with toluene in accordance with the procedure described in Example 1. All experiments were carried out at a radiation intensity of 0.9 Megarad/hour. Table 3 shows the percentage of insoluble matter which was obtained at irradiation doses of 0.25, 0.5, 0.75, 1.0 and 1.25 Megarads from polyacrylate C alone or mixed with polymerisable monomers. The table which follows shows that the polyacrylate C tested, and its mixtures with polymerisable monomers, can be crosslinked to a high degree by irradiation with gamma-rays.

Table 3

Percentage of insoluble matter of mixtures of polyacrylate C and polymerisable monomers cured at various curing doses

| Polyacrylate | Monomer | Weight ratio of polyacrylate:monomer | Insoluble matter (%) | | | | |
|---|---|---|---|---|---|---|---|
| | | | 0.25 Mrad | 0.5 Mrad | 0.75 Mrad | 1.0 Mrad | 1.25 Mrad |
| C | — | 100 : 0 | 94 | 99 | 99 | 100 | 100 |
| C | Styrene | 70 : 30 | Liquid | 97 | 98 | 99 | 100 |
| C | Butyl acrylate | 70 : 30 | 60 | 99 | 99 | 99 | 99 |
| C | Methyl methacrylate | 70 : 30 | Liquid | 87 | 97 | 97 | 100 |

We claim:

1. Process for curing polyacrylates by means of ionizing rays selected from accelerated electron rays in the dosage of from 0.5 to 7 Megarads and gamma radiation in the dosage of from 0,25 to 1.25 Megarads, said dosages producing nontacky films characterized in that compounds of the formula I

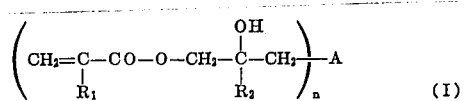

(I)

wherein $R_1$ and $R_2$ independently of one another each represent a hydrogen atom or the methyl group, $n$ denotes the number 2 or 3 and A denotes an organic radical which contains at least one grouping

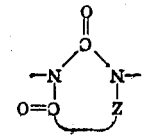

in which Z denotes a divalent radical which is required to complete a five-membered or six-membered, unsubstituted or substituted, heterocyclic ring, are irradiated.

2. Process according to claim 1, characterized in that polyacrylates of formula I mixed with olefinically unsaturated monomers in the ratio of 66 to 80 to 34 to 20 parts by weight, respectively, are irradiated.

3. Process according to claim 1, characterised in that the curing of the polyacrylates is effected with an ionising radiation by means of electrons of average energy at least 50 keV and at most 4 MeV.

4. Process according to claim 1, characterised in that the curing of the polyacrylates is effected with an ionising radiation by means of electrons of average energy 50 to 600 KeV.

5. Process according to claim 1, characterised in that the curing of the polyacrylates is effected with an ionising radiation in the form of gammarays.

6. Process according to claim 1, characterised in that the polyacrylates are additionally subjected to a heat treatment before, during or after the action of an ionising radiation.

7. Process according to claim 1, characterised in that the action of an ionising radiation on the polyacrylates is allowed to take place in an atmosphere of low oxygen content.

8. Process according to claim 1, characterised in that polyacrylates of the formula I are used, in which the radical A contains one hydantoinylene group.

9. Process according to claim 1, characterised in that polyacrylates of the formula I are used in which the radical A denotes a radical of the formula

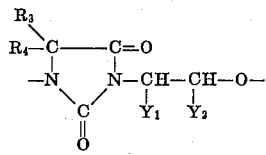

11. Process according to claim 1, characterised in that polyacrylates of the formula I are used in which the radical A contains at least two hydantoinylene groups.

12. Process according to claim 11, characterised in that polyacrylates of the formula I are used in which the radical A denotes a radical of the formulae

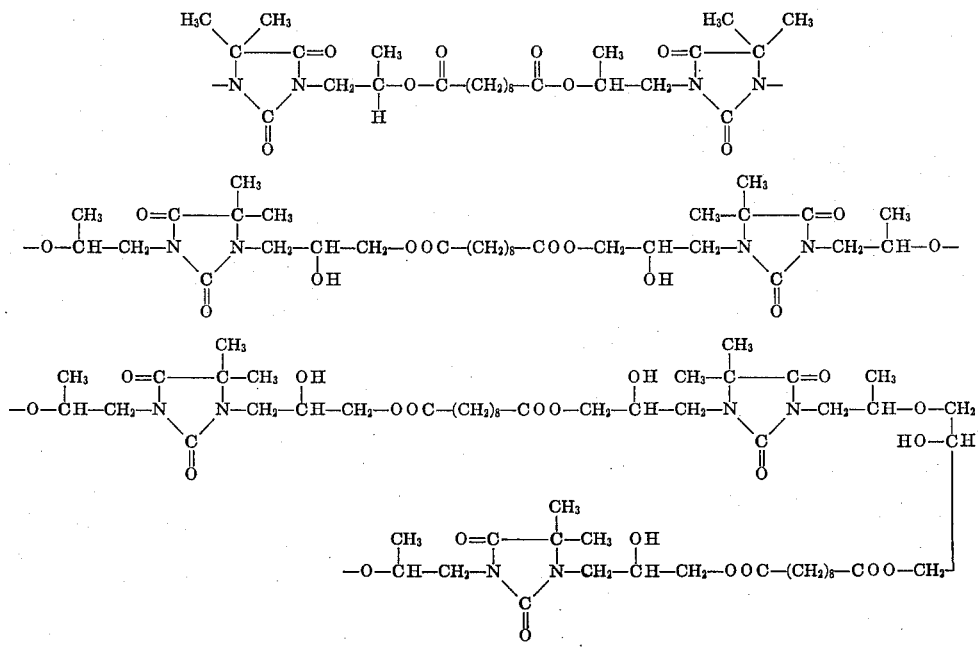

wherein $R_3$ and $R_4$ independently of one another each denote a hydrogen atom or a lower alkyl group, $Y_1$ represents a hydrogen atom or the methyl group and $Y_2$ represents a hydrogen atom or the methyl, ethyl or phenyl group, or wherein $Y_1$ and $Y_2$ together denote the trimethylene or tetramethylene radical.

10. Process according to claim 9, characterised in that polyacrylates of the formula I are used to which the radical A denotes a radical of the formula

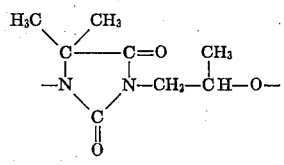

13. Process according to claim 2, characterised in that the curable polyacrylate mixture contains methyl acrylate, butyl acrylate, methyl methacrylate, acrylonitrile, styrene, ethylene glycol dimethacrylate, divinylbenzene, vinyl acetate or diallyl-o-phthalate as the monomer.

14. Process according to claim 1, characterised in that the curable synthetic resin mixture additionally contains fillers, pigments and/or plasticisers.

* * * * *